(12) United States Patent
Li et al.

(10) Patent No.: US 12,400,294 B2
(45) Date of Patent: Aug. 26, 2025

(54) IMAGE PROCESSING DEVICE AND SUPER-RESOLUTION PROCESSING METHOD

(71) Applicants: HON HAI PRECISION INDUSTRY CO., LTD., New Taipei (TW); Foxconn Technology Group Co., Ltd., Guangdong (CN)

(72) Inventors: Yung-Hui Li, New Taipei (TW); Chi-En Huang, New Taipei (TW)

(73) Assignees: HON HAI PRECISION INDUSTRY CO., LTD., New Taipei (TW); Foxconn Technology Group Co., Ltd., Guangdong (CN)

( * ) Notice: Subject to any disclaimer, the term of this patent is extended or adjusted under 35 U.S.C. 154(b) by 467 days.

(21) Appl. No.: 17/823,960

(22) Filed: Sep. 1, 2022

(65) Prior Publication Data

US 2023/0063201 A1    Mar. 2, 2023

Related U.S. Application Data

(60) Provisional application No. 63/239,423, filed on Sep. 1, 2021.

(51) Int. Cl.
*G06T 3/4053* (2024.01)
*G06T 3/4046* (2024.01)
*G06T 3/4076* (2024.01)

(52) U.S. Cl.
CPC .......... *G06T 3/4053* (2013.01); *G06T 3/4046* (2013.01); *G06T 3/4076* (2013.01)

(58) Field of Classification Search
CPC .... G06T 3/4053; G06T 3/4046; G06T 3/4076
See application file for complete search history.

(56) References Cited

U.S. PATENT DOCUMENTS

2013/0011078 A1   1/2013  Phan et al.
2016/0171658 A1   6/2016  Matson et al.
(Continued)

FOREIGN PATENT DOCUMENTS

CN   103095977 A   5/2013
CN   109034198 A   12/2018
(Continued)

OTHER PUBLICATIONS

C. Chen, D. Gong, H. Wang, Z. Li and K.-Y. K. Wong, "Learning Spatial Attention for Face Super-Resolution," in IEEE Transactions on Image Processing, vol. 30, pp. 1219-1231, 2021, doi: 10.1109/TIP.2020.3043093. Date of Publication: Dec. 14, 2020. (Year: 2020).*

(Continued)

*Primary Examiner* — Molly Wilburn
(74) *Attorney, Agent, or Firm* — CKC & Partners Co., LLC

(57) ABSTRACT

An image processing device is provided, which includes an image capture circuit and a processor. The image capturing circuit is configured for capturing a high-resolution image. The processor is connected to the image capturing circuit, and performing a super-resolution model and an attention model, where the processor is configured to perform following operations for: performing down sampling processing on the high-resolution image to generate a low-resolution image; performing super-resolution processing on the low-resolution image using the super-resolution model to generate a super-resolution image; applying the attention model to the high-resolution image and the super-resolution image to generate an attention weighted high-resolution image and an attention weighted super-resolution image, and calculating a first loss according to the attention weighted high-resolution image and the attention weighted (Continued)

super-resolution image, thereby updating the super-resolution model.

20 Claims, 9 Drawing Sheets

(56) References Cited

U.S. PATENT DOCUMENTS

| | | |
|---|---|---|
| 2020/0311871 A1 | 10/2020 | Yu et al. |
| 2021/0004935 A1 | 1/2021 | Yao et al. |
| 2021/0073945 A1 | 3/2021 | Kim et al. |
| 2021/0104018 A1 | 4/2021 | Moon et al. |
| 2021/0133925 A1 | 5/2021 | Lee et al. |
| 2022/0108212 A1* | 4/2022 | Zhai ............... G06F 17/14 |
| 2022/0286696 A1* | 9/2022 | Gao ............... H04N 19/147 |
| 2024/0185386 A1* | 6/2024 | Pan ............... G06T 3/4046 |

FOREIGN PATENT DOCUMENTS

| | | |
|---|---|---|
| CN | 109816593 A | 5/2019 |
| CN | 110175953 A | 8/2019 |
| CN | 110717856 A | 1/2020 |
| CN | 110852948 A | 2/2020 |
| CN | 111222466 A | 6/2020 |
| CN | 111402137 A | 7/2020 |
| TW | I419059 B | 12/2013 |
| WO | 2020187220 A1 | 9/2020 |
| WO | 2020238558 A1 | 12/2020 |

OTHER PUBLICATIONS

J. Wang, et al., "Lightweight Feedback Convolution Neural Network for Remote Sensing Images Super-Resolution," in IEEE Access, vol. 9, pp. 15992-16003 (Year: 2021).

T. Dai, et al., "Image Super-Resolution via Residual Block Attention Networks", 2019 IEEE/CVF International Conference on Computer Vision Workshop (ICCVW), Seoul, Korea (South), pp. 3879-3886 (Year: 2019).

Fan Fan, et al., "Abdominal MRI image multi-scale super-resolution reconstruction based on parallel channel-spatial attention mechanism", Journal of Computer Applications, Dec. 10, 2020, p. 3624-3630, vol. 40, No. 12, China Academic Journal Electronic Publishing House, China.

Jing Chen, "Research on Image Super-resolution Reconstruction Technology Based on Deep Learning", Master's degree thesis, Apr. 2020, Nanjing University of Posts and Telecommunications, China.

Da li Gao, "Research on Airport Runway FOD Detection Algorithm Based on Convolutional Neural Network", Matster's Degree thesis, Jul. 2020, Xidian University, China.

Yueqi Zhong, "Principles, Techniques and Applications of Artificial Intelligence", Sep. 2020, p. 113, Donghua University Press Co., Ltd., China.

Zhihao Fan, et al., "Mask Attention Networks Rethinking and Strengthen Transformer", ARXIV, May 25, 2021, p. 1-10, Cornell University, United States. (https://doi.org/10.48550/arXiv.2103.13597).

Gaopeng Hu, et al., "Image super-resolution reconstruction based on deep progressive back-projection attention network", Journal of Computer Applications, Jul. 10, 2020, p. 2077-2083, vol. 40, No. 7, China Academic Journal Electronic Publishing House, China.

* cited by examiner

IMAGE PROCESSING DEVICE AND SUPER-RESOLUTION PROCESSING METHOD

CROSS-REFERENCE TO RELATED APPLICATION

This application claims priority to U.S. Provisional Application Ser. No. 63/239,423, filed Sep. 1, 2021, which is herein incorporated by reference in its entirety.

BACKGROUND

Field of Disclosure

The disclosure relates to an image processing technology. More particularly, the disclosure relates to an image processing device and a super-resolution processing method.

Description of Related Art

As far as the current image processing technology is concerned, a super-resolution processing is often performed on an image to perform various downstream tasks. For example, improving clarity of medical images, biometric images, or improving image segmentation for self-driving cars. Therefore, whether the content of processed super-resolution image can accurately present "crucial details required by downstream tasks" has become a key issue in the current super-resolution processing.

SUMMARY

The disclosure provides an image processing device, which comprises an image capturing circuit and a processor. The image capturing circuit is configured for capturing a high-resolution image. The processor is connected to the image capturing circuit, and performing a super-resolution model and an attention model, wherein the processor is configured to perform following operations for: performing down sampling processing on the high-resolution image to generate a low-resolution image; performing super-resolution processing on the low-resolution image using the super-resolution model to generate a super-resolution image; applying the attention model to the high-resolution image and the super-resolution image to generate an attention weighted high-resolution image and an attention weighted super-resolution image, and calculating a first loss according to the attention weighted high-resolution image and the attention weighted super-resolution image; and updating the super-resolution model according to the first loss.

The disclosure provides a super-resolution processing method, which comprises: capturing a high-resolution image, and performing down sampling processing on the high-resolution image to generate a low-resolution image; performing super-resolution processing on the low-resolution image using a super-resolution model to generate a super-resolution image; applying an attention model to the high-resolution image and the super-resolution image to generate an attention weighted high-resolution image and an attention weighted super-resolution image, and calculating a first loss according to the attention weighted high-resolution image and the attention weighted super-resolution image; and updating the super-resolution model according to the first loss.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
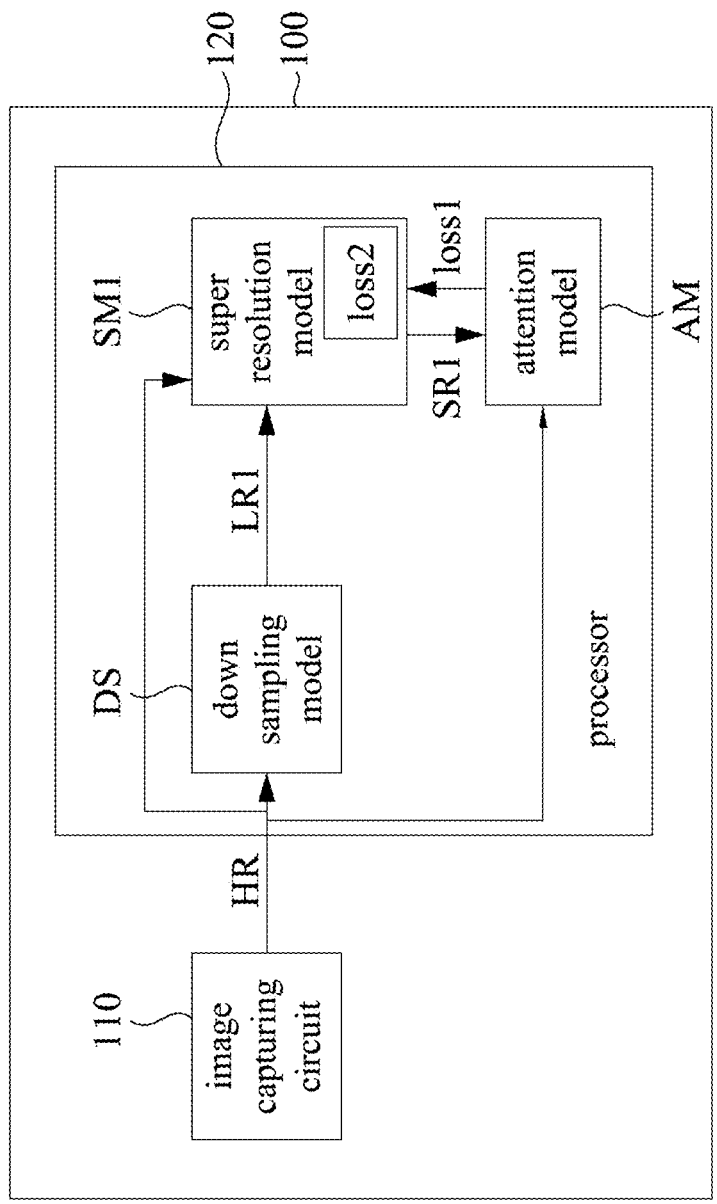
FIG. 1 is a block diagram of an image processing device of the present disclosure.

Reference will now be made in detail to the present embodiments of the disclosure, examples of which are illustrated in the accompanying drawings. Wherever possible, the same reference numbers used in the drawings and the description refer to the same or similar parts.

Reference is made to FIG. 1, and FIG. 1 is a block diagram of an image processing device 100 of the present disclosure. In one embodiment, the image processing device 100 includes an image capturing circuit 110 and a processor 120. The image capturing circuit 110 is used for capturing a high-resolution image HR. The processor 120 is connected to the image capturing circuit 110.

In some embodiments, the image processing device 100 can be established by a computer, a server, or a data processing center. In some embodiments, the image capture circuit 110 can be a camera for capturing images or a camera capable of taking pictures continuously. For example, a digital single-lens reflex camera (DSLR), a digital video camera (DVC) or a near-infrared camera (NIRC) and so on. In some embodiments, the processor 120 can be implemented by a processing unit. For example, a graphics processing unit (GPU), a central processing unit (CPU), or a tensor processing unit (TPU) and so on.

In some embodiments, the image processing device 100 is not limited to include the image capture circuit 110 and the processor 120. The image processing device 100 can further include other components required to operating the image processing device 100 in various applications. For example, the image processing device 100 can further include an output interface (e.g., a display panel for displaying information), an input interface (e.g., a touch panel, a keyboard, a microphone, a scanner or a flash memory reader) and a communication circuit (e.g., a WiFi communication module, a Bluetooth communication module, a wireless telecommunication module, etc.).

As shown in FIG. 1, the processor 120 performs a super-resolution model SM1 and an attention model AM based on corresponding software or firmware instruction programs.

In some embodiments, the processor 120 can further perform a down sampling model DS based on a corresponding software or firmware instruction program, and can perform down sampling processing on the high-resolution image HR using the down sampling model DS to generate low-resolution images, where resolution of the low-resolution image LR is lower than resolution of the high-resolution image HR.

In some embodiments, the super-resolution model SM1 can be used to perform super-resolution processing on the low-resolution image LR to generate a super-resolution image SR1, where resolution of the super-resolution image SR1 is same as the resolution of the high-resolution image HR. It should be noted that the super-resolution model SM1 can be any model that can perform the super-resolution processing, and there is not particularly limited. For example, the super-resolution model SM1 can be a super-resolution generative adversarial network (SRGAN), a deep recursive convolutional network (DRCN) or a super-resolution convolution neural network (SRCNN), etc.

In some embodiments, the attention model AM can be used to perform image filtering processing on the super-resolution image SR1 and the high-resolution image HR. Next, a distance function operation is performed on the processed super-resolution image SR1 and the processed high-resolution image HR to generate a first loss loss1, so as to update the super-resolution model SM1 according to the first loss loss1. The detailed method will be described in detail in the following paragraphs.

In some embodiments, the super-resolution model SM1 can generate a second loss loss2 in the process of generating the super-resolution image SR1, and can update the super-resolution model SM1 according to the first loss1 and the second loss loss2. The detailed method will be described in detail in the following paragraphs.

Figure 2:
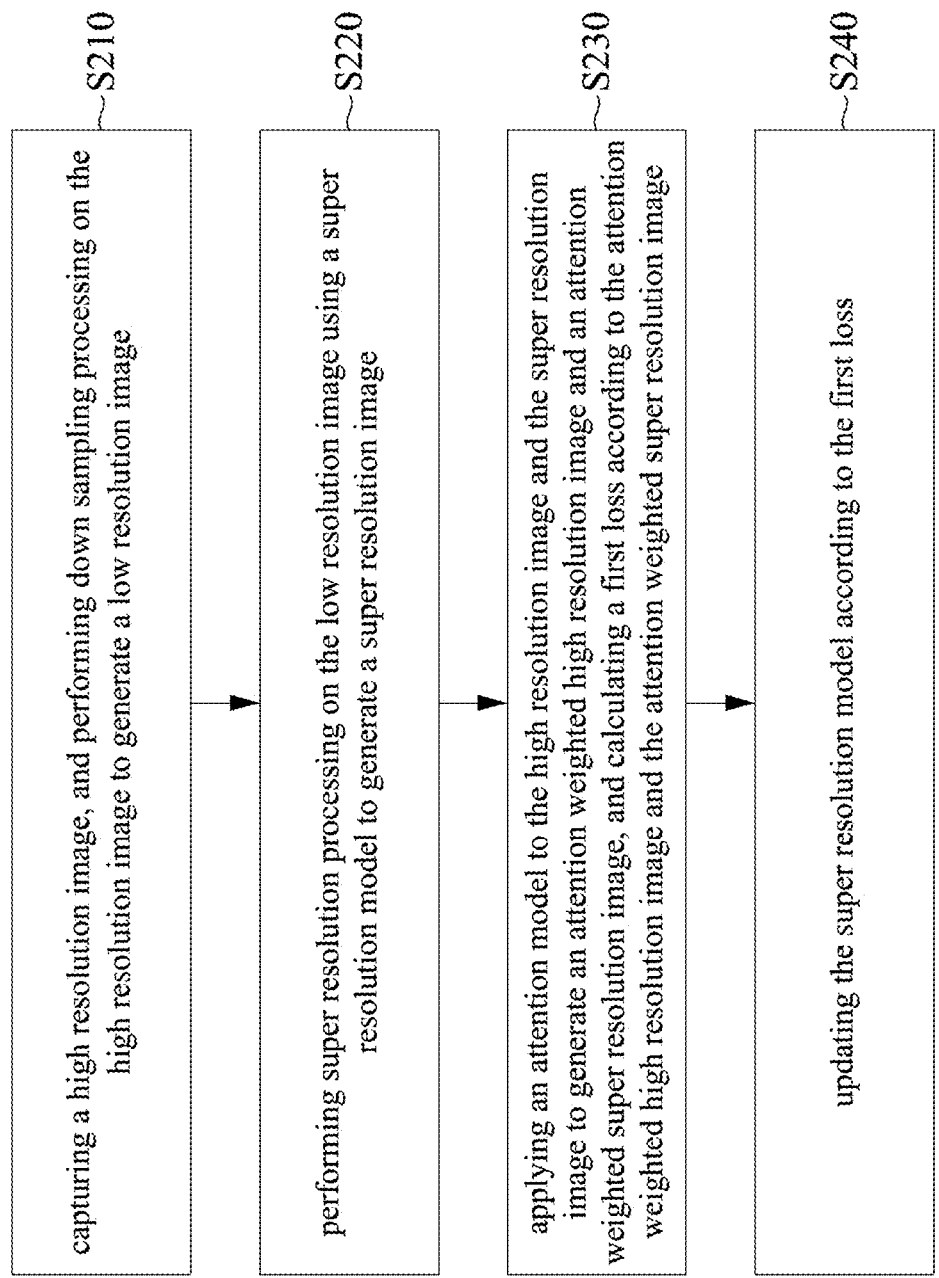
FIG. 2 is a flowchart of a super-resolution processing method of the present disclosure.

Reference is made to FIG. 2, and FIG. 2 is a flowchart of a super-resolution processing method of the present disclosure. The method of the embodiment shown in FIG. 2 is applicable to the image processing device 100 of FIG. 1, but is not limited thereto. For the sake of convenience and clarity of description, the detailed steps of the super-resolution processing method shown in FIG. 2 are described below with reference to both FIG. 1 and FIG. 2.

In one embodiment, the super-resolution processing method includes steps S210 to S240. Firstly, in step S210, capturing the high-resolution image HR, and performing the down sampling processing on the high-resolution image HR to generate the low-resolution image LR.

Furthermore, in step S220, performing the super-resolution processing on the low-resolution image LR using the super-resolution model SM1 to generate the super-resolution image SR1.

In some embodiments, parameters and initial values of hyper parameters of the super-resolution model SM1 can be average values obtained from past training experiences or artificially given preset values.

Furthermore, in step S230, applying the attention model AM to the high-resolution image HR and the super-resolution image SR1 to generate an attention weighted high-resolution image and an attention weighted super-resolution image, and calculating the first loss loss1 according to the attention weighted high-resolution image and the attention weighted super-resolution image.

In some embodiments, the attention model AM can be applied to the high-resolution image HR and the super-resolution image SR1 for performing the image filtering processing to generate the attention weighted high-resolution image and the attention weighted super-resolution image, where the image filtering processing is an element-wise multiplication operation, an element-wise addition operation, an element-wise subtraction operation, or a combination thereof.

In some embodiments, the attention model AM can include a mask processing model corresponding to at least one image mask. In this way, the image filtering processing can be performed on the high-resolution image HR and the super-resolution image SR1 respectively using the mask processing model to generate the attention weighted high-resolution image and the attention weighted super-resolution image.

In some embodiments, the at least one image mask corresponds to at least one image region of interest (ROI). In this way, the element-wise multiplication operation can be performed on the high-resolution image HR and the super-resolution image SR1 respectively according to the at least one image ROI to generate the attention weighted high-resolution image and the attention weighted super-resolution image, where the attention weighted high-resolution image and the attention weighted super-resolution image correspond to the high-resolution image HR and the super-resolution image SR1, respectively In some embodiments, the at least one image mask corresponds to at least one weight set. In this way, the element-wise multiplication operation can be performed on the high-resolution image HR and the super-resolution image SR1 respectively according to the at least one weight set to generate the attention weighted high-resolution image and the attention weighted super-resolution image, where the attention weighted high-resolution image and the attention weighted super-resolution image correspond to the high-resolution image HR and the super-resolution image SR1, respectively.

In some embodiments, the aforementioned image ROI and its corresponding weight sets can be set according to the high-resolution image HR in various usage scenarios. For example, in a usage scenario of iris recognition, arbitrary image feature extraction operations (e.g., convolutional neural networks) can be performed on the high-resolution image HR to extract feature regions from the high-resolution image HR to generate a binary mask or set different degrees of weight values for regions with features to form a semantic ROI mask, where the semantic ROI mask can be a 3 degree of freedom (DOF) Mask or a Multiple DOF Mask, etc.

In some embodiments, the weight value in the binary mask or the semantic ROI mask can be used to perform multiplication operation on the corresponding pixel value in the high-resolution image HR respectively to generate the attention weighted high-resolution image, and the weighted values in the binary mask or the semantic ROI mask can be used to perform multiplication operation on the corresponding pixel values in the super-resolution image SR1 to generate an attention weighted super-resolution image.

In some embodiments, the distance function operation can be performed according to the attention weighted high-resolution image and the attention weighted super-resolution image to generate the first loss loss1, where the distance function operation is an L1 distance operation, an L2 distance operation, a Charbonnier distance operation, or a combination thereof.

Furthermore, in step S240, updating the super-resolution model SM1 according to the first loss loss1. In some embodiments, the parameters of the super-resolution model SM1 can be updated according to the first loss loss1 to generate an updated super-resolution model.

In some embodiments, the super-resolution model can be used to calculate the second loss loss2 according to the high-resolution image HR and the super-resolution image SR1. Next, a total loss can be calculated according to the first loss loss1 and the second loss loss2, and a back propagation operation can be performed on the super-resolution model SM1 according to the total loss to generate the updated super-resolution model.

By the aforementioned steps, the image processing device 100 can update the super-resolution model SM1 according to the first loss loss1 generated by the attention model AM and the second loss loss2 generated by the super-resolution model SM1 in the training phase. In this way, key details required by downstream tasks can be accurately presented (i.e., the ROI in the high-resolution image HR will have a stronger effect of super-resolution).

Figure 3:
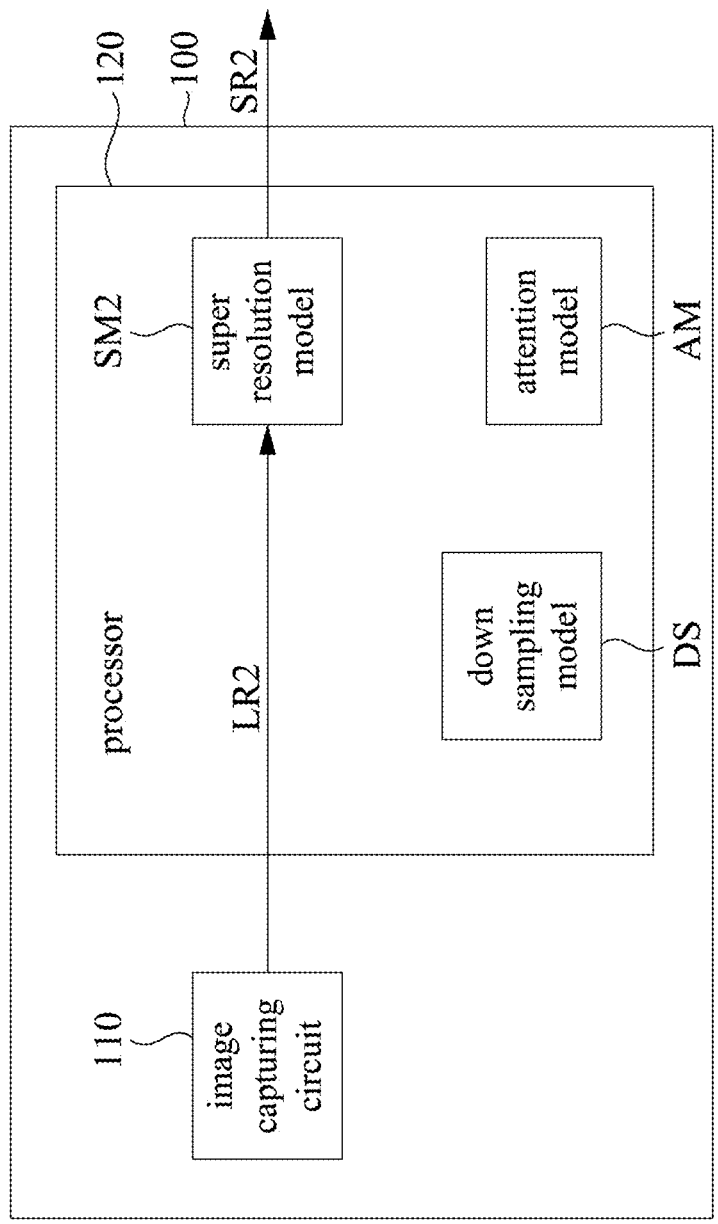
FIG. 3 is a block diagram of an image processing device according to some embodiments of the present disclosure.
Figure 4:
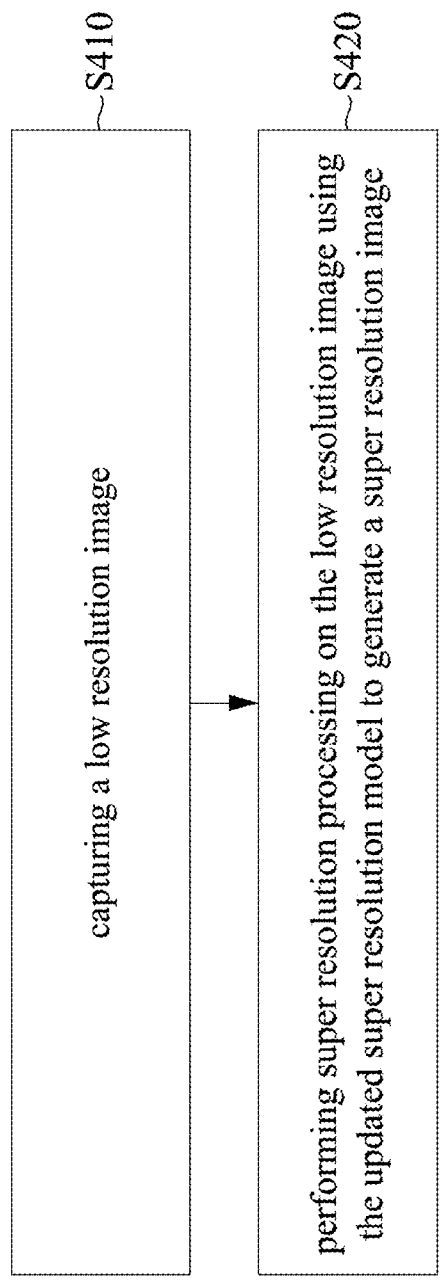
FIG. 4 is a flowchart of a super-resolution processing method according to some embodiments of the present disclosure.

Reference is made to FIG. 3 and FIG. 4, where FIG. 3 is a block diagram of an image processing device 100 according to some embodiments of the present disclosure, and FIG. 4 is a flowchart of a super-resolution processing method according to some embodiments of the present disclosure. The super-resolution processing method in FIG. 4 is applicable to the image processing device 100 in FIG. 3, but not limited thereto. The detailed steps of the super-resolution processing method shown in FIG. 4 will be described with reference to the operation relationship among the elements in the image processing device 100. It should be noted that the difference between FIG. 3 and FIG. 1 is only that the processor 120 in the image processing device 100 can perform the updated super-resolution model SM2. Therefore, the other similar elements will not be further described.

Firstly, in step S410, capturing a low-resolution image LR2. Furthermore, in step S420, performing super-resolution processing on the low-resolution image LR2 using the updated super-resolution model SM2 to generate a super-resolution image SR2. Further, after the model training (i.e., getting the updated super-resolution model SM2) is completed, the low-resolution image LR2 can be further captured by an image capture circuit 110 to perform the super-resolution processing by a processor 120 using the updated super-resolution model SM2 to generate the super-resolution image SR2, where resolution of the super-resolution image SR2 is higher than resolution of the low-resolution image LR2.

By the aforementioned steps, the image processing device 100 can directly use the updated super-resolution model SM2 to perform the super-resolution processing in the application phase to obtain the required super-resolution image SR2.

Figure 5:
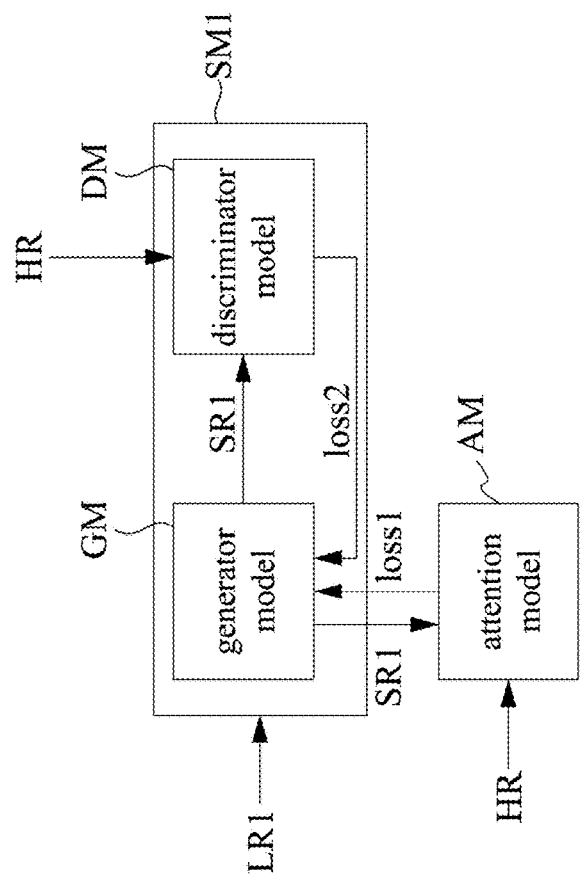
FIG. 5 is a schematic diagram of a super-resolution model according to some embodiments of the present disclosure.

Specific examples of the super-resolution model SM1 and the attention model AM will be presented below. Reference is made to FIG. 5, and FIG. 5 is a schematic diagram of a super-resolution model SM1 according to some embodiments of the present disclosure. As shown in FIG. 5, the super-resolution model SM1 can be an SRGAN, which includes a generator model GM and a discriminator model DM, where the discriminator model DM can include a classifier model (not shown) and a feature extractor model (not shown).

Firstly, the generator model GM can be used to generate the super-resolution image SR1 according to the low-resolution image LR, so as to transmit the super-resolution image SR1 to the discriminator model DM and the attention model AM. Next, the classifier model and the feature extractor model in the discriminator model DM can respectively calculate two loss values (i.e., perceptual loss and adversarial loss) (perceptual loss and adversarial loss) according to the super-resolution image SR1 and the high-resolution image HR, and the discriminator model DM can calculate the second loss loss2 according to the two loss values and two weight values corresponding to the two loss values respectively. The attention model AM can generate the first loss loss1 according to the super-resolution image SR1. Next, the generator model GM can multiply the first loss loss1 by the first weight value, and can multiply the second loss loss2 by the second weight value, so as to add the two obtained products to generate the total loss. It should be noted that the aforementioned two weight values corresponding to the two loss values respectively, the aforementioned first weight value and the aforementioned second weight value can also be average values obtained from past training experiences or artificially given preset values. Finally, the generator model GM can update the parameters and hyper parameters of the super-resolution model SM1 according to the total loss to generate the updated super-resolution model.

Figure 6:
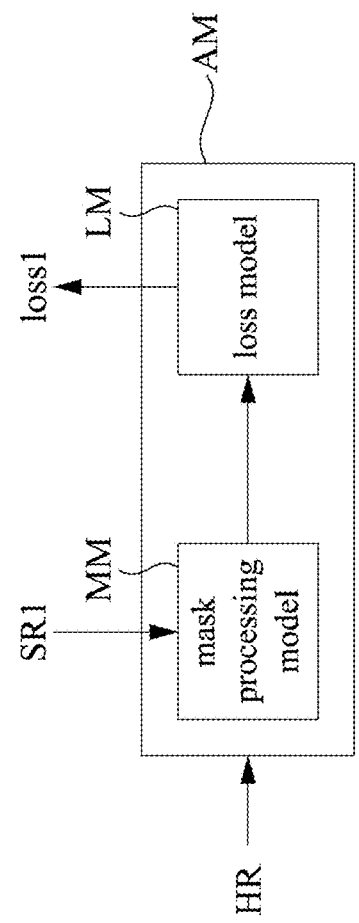
FIG. 6 is a schematic diagram of an attention model according to some embodiments of the present disclosure.

Reference is made to FIG. 6, and FIG. 6 is a schematic diagram of an attention model AM according to some embodiments of the present disclosure. As shown in FIG. 6, the attention model AM can include a mask processing model MM and a loss model LM.

Firstly, the mask processing model MM can perform the element-wise multiplication operation on the preset mask image and the super-resolution image SR1 to generate the attention weighted super-resolution image, and can perform the element-wise multiplication operation on the mask image and the high-resolution image HR to generate the attention weighted high-resolution image, so as to take the attention weighted high-resolution image and the attention weighted super-resolution image as the input of the loss model LM. Next, the loss model LM can perform the L1 distance operation between the elements of the images on the attention weighted super-resolution image and the attention weighted high-resolution image, so as to generate a first loss loss1.

Figure 7:
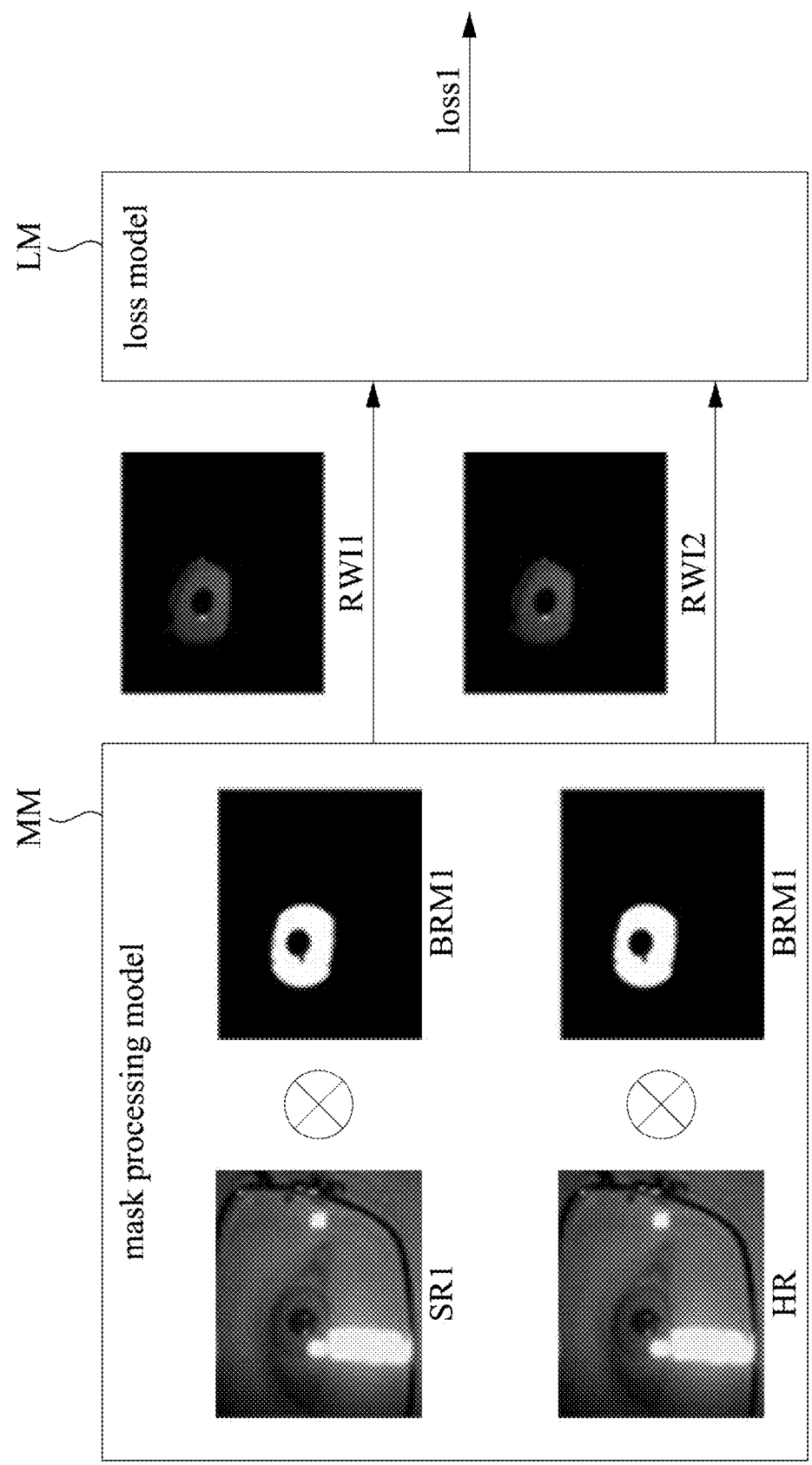
FIG. 7 is a schematic diagram of implementing the attention model according to some embodiments of the present disclosure.

Further, examples of implementing the attention model AM in various usage scenarios are presented below. Reference is made to FIG. 7, and FIG. 7 is a schematic diagram of implementing the attention model AM according to some embodiments of the present disclosure. As shown in FIG. 7, in the usage scenario of the iris recognition, the mask processing model MM can set a binary mask BRM1 for the high-resolution image HR, where values of weight values of white regions in the binary mask BRM1 is set to 1 (i.e., the image ROI corresponding to a retina), values of weight values of black regions in the binary mask BRM1 are set to 0 (i.e., non-image ROI).

Next, the mask processing model MM can sequentially perform the multiplication operation on pixel values of pixels in the super-resolution image SR1 with the weight values in the binary mask BRM1 to generate the attention weighted super-resolution image RWI1, and can sequentially perform the multiplication operation on pixel values of pixels in the high-resolution image HR with the weight values in the binary mask BRM1 to generate the attention weighted high-resolution image RWI2. Finally, the loss model LM can receive attention weighted super-resolution images RWI1 and attention weighted high-resolution images RWI2, can sequentially subtract pixel values of pixels of the attention weighted super-resolution image RWI1 from pixel values of the pixels of the attention weighted high-resolution image RWI2, can take absolute values of an obtained differences, and finally can sum them up to generate the first loss loss1 (i.e., L1 distance operation).

Figure 8:
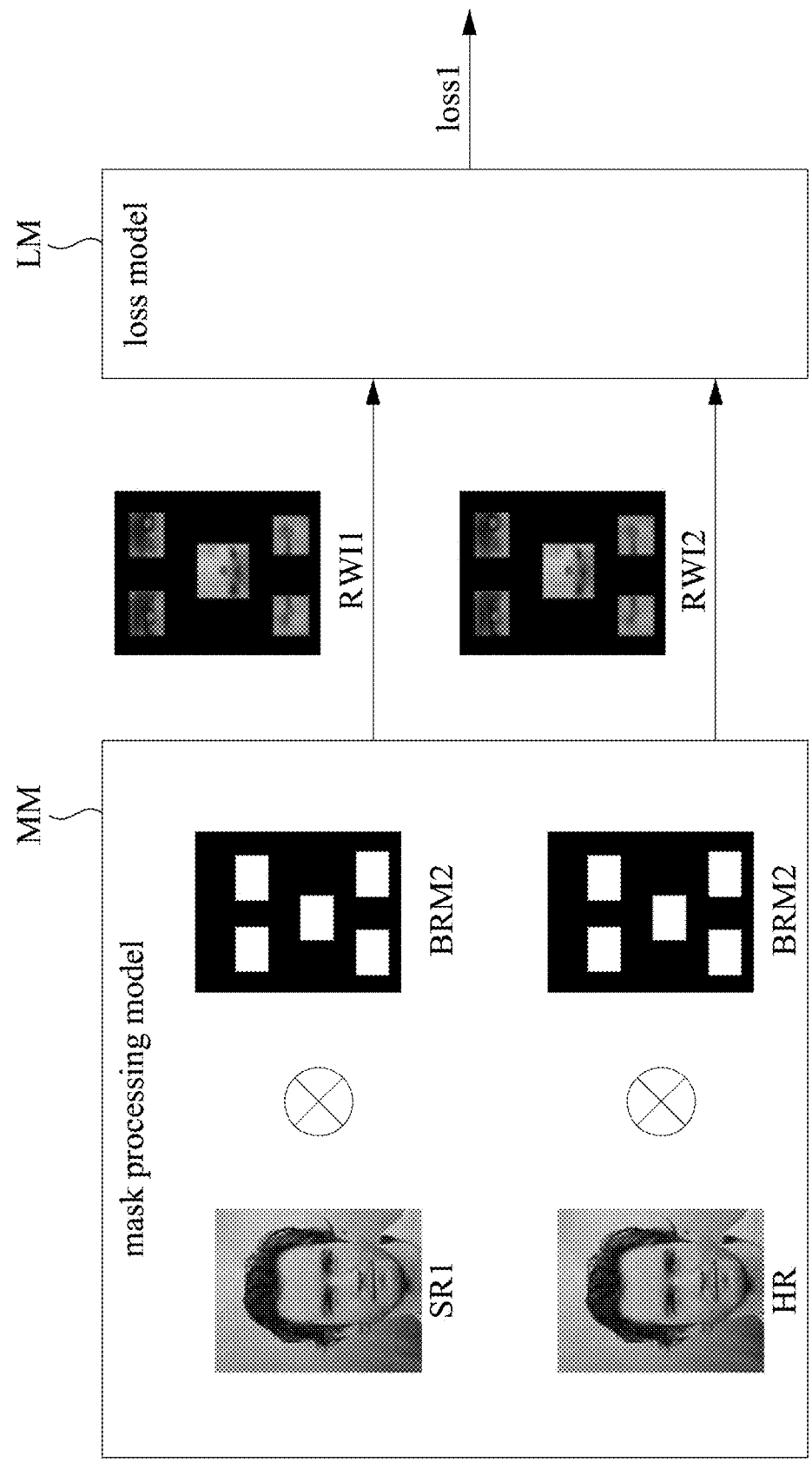
FIG. 8 is a schematic diagram of implementing the attention model according to other embodiments of the present disclosure.

Reference is made to FIG. 8, and FIG. 8 is a schematic diagram of implementing the attention model AM according to other embodiments of the present disclosure. As shown in FIG. 8, in the usage scenario of face recognition, the mask processing model MM can set a binary mask BRM2 for the high-resolution image HR, where weight values of pixels in white regions in the binary mask BRM2 is set to 1 (i.e., the image ROI corresponding to a face feature), and weight values of pixels of black regions in the binary mask BRM2 is set to 0 (i.e., the non-image ROI).

Next, the mask processing model MM can sequentially perform the multiplication operation on pixel values of pixels in the super-resolution image SR1 with the weight values in the binary mask BRM2 to generate the attention weighted super-resolution image RWI1, and can sequentially perform the multiplication operation on pixel values of pixels in the high-resolution image HR with the weight values in the binary mask BRM2 to generate the attention weighted high-resolution image RWI2. Finally, the loss model LM can receive attention weighted super-resolution images RWI1 and attention weighted high-resolution images RWI2, sequentially subtract pixel values of pixels of the attention weighted super-resolution image RWI1 from pixel values of the pixels of the attention weighted high-resolution image RWI2, take absolute values of an obtained differences, and finally sum them up to generate the first loss loss1 (i.e., L1 distance operation).

Figure 9:
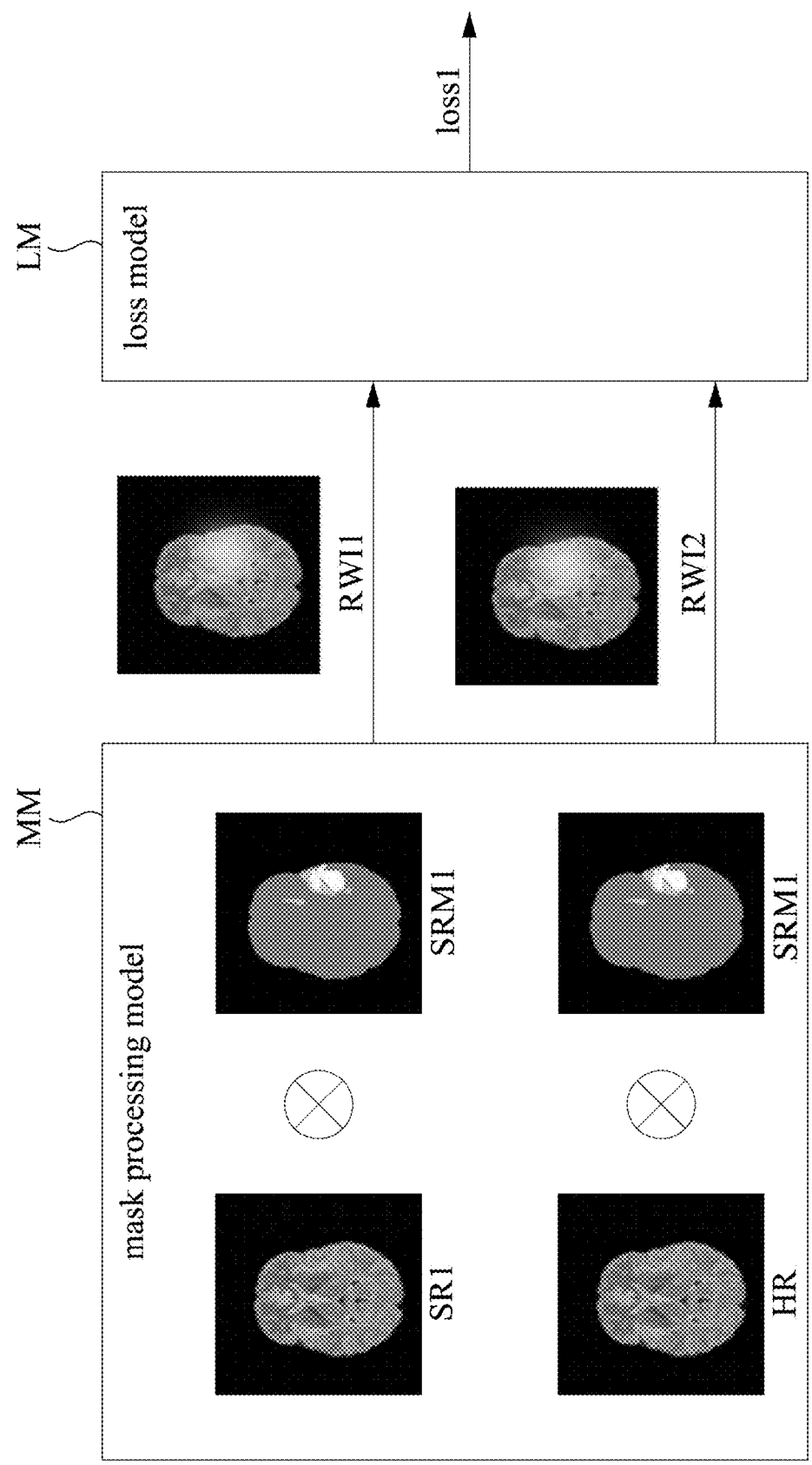
FIG. 9 is a schematic diagram of implementing the attention model according to other embodiments of the present disclosure.

Reference is made to FIG. 9, and FIG. 9 is a schematic diagram of implementing the attention model AM according to other embodiments of the present disclosure. As shown in FIG. 9, in the usage scenario of medical image recognition, the mask processing model MM can set a semantic ROI mask SRM1 (a 3 DOF Mask) for the high-resolution image HR, where pixel of white regions in the semantic ROI mask SRM1 is set as a highest weight value (i.e., the image ROI corresponding to a tumor tissue), pixels of gray regions in the semantic ROI mask SRM1 are set to a next highest weight value (i.e., the less important image ROI corresponding to a brain tissue), and pixels of black regions in the semantic ROI mask SRM1 are set to a lowest weight value (i.e., non-image ROI).

For example, in the semantic ROI mask SRM1, the pixels of the image ROI corresponding to the tumor tissue have higher gray level values, the pixels of a less important image ROI corresponding to the brain tissue have the next highest gray level value, and pixels in a non-image ROI have a lowest gray level value, where these gray level values are respectively equal to weight values in a weight set.

Next, the mask processing model MM can sequentially perform the multiplication operation on pixel values of pixels in the super-resolution image SR1 with the weight values in the semantic ROI mask SRM1 to generate the attention weighted super-resolution image RWI1, and sequentially perform the multiplication operation on pixel values of pixels in the high-resolution image HR with the weight values in the semantic ROI mask SRM1 to generate the attention weighted high-resolution image RWI2.

Next, the loss model LM can receive attention weighted super-resolution images RWI1 and attention weighted high-resolution images RWI2, sequentially subtract pixel values of pixels of the attention weighted super-resolution image RWI1 from pixel values of the pixels of the attention weighted high-resolution image RWI2, take absolute values of an obtained differences, and finally sum them up to generate a sum of differences (i.e., L1 distance operation). Next, the loss model LM can further perform the Euclidean distance operation on the attention weighted super-resolution image RWI1 and the attention weighted high-resolution image RWI2 to generate an Euclidean distance value (i.e., L2 distance operation). Finally, the loss model LM can perform a weighting operation on the L1 distance value and the L2 distance value according to two preset weight values corresponding to the L1 distance value and the L2 distance value to generate the first loss loss1.

Figure 10:
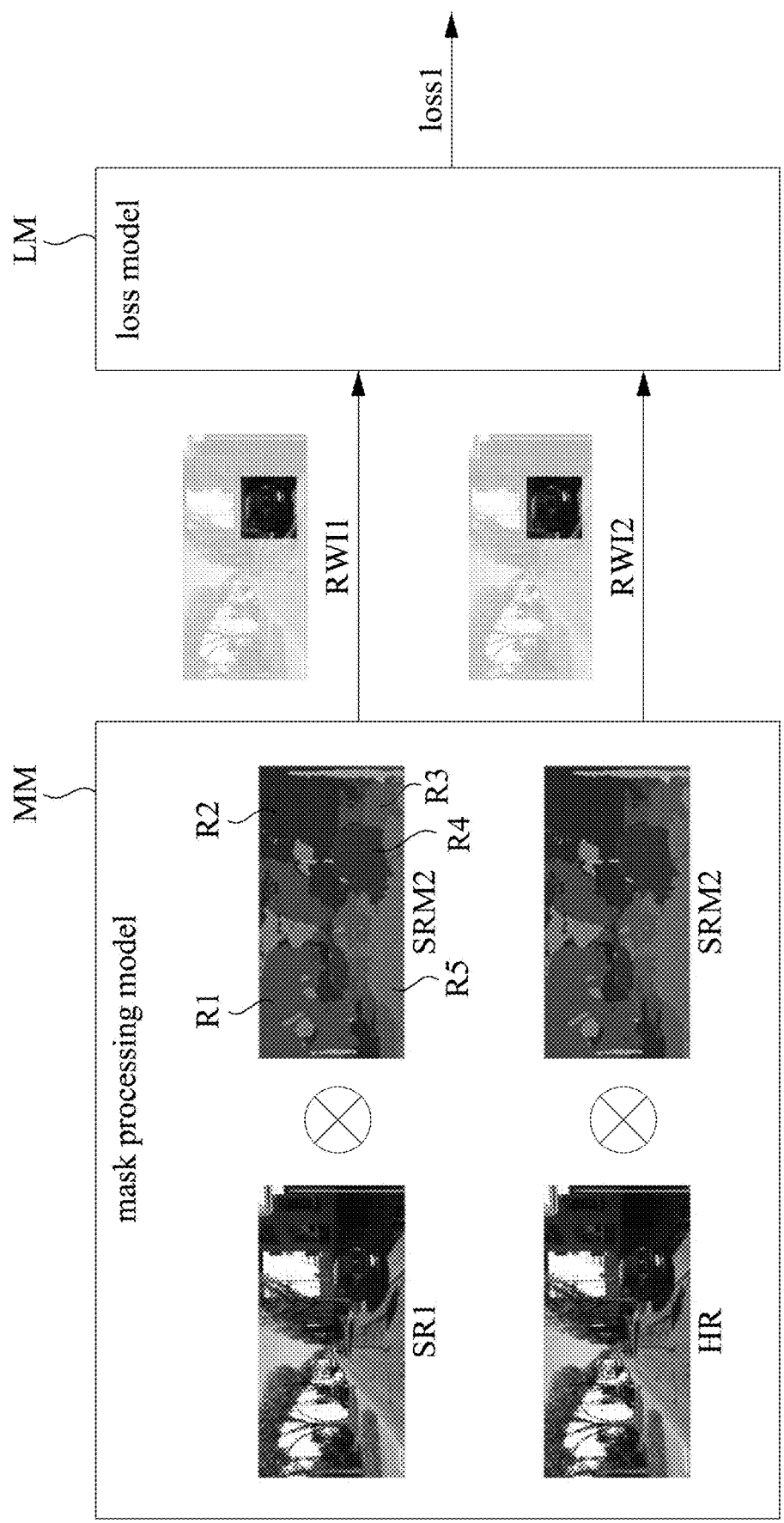
FIG. 10 is a schematic diagram of implementing the attention model according to other embodiments of the present disclosure.

Reference is made to FIG. 10, and FIG. 10 is a schematic diagram of implementing the attention model AM according to other embodiments of the present disclosure. As shown in FIG. 10, in the usage scenario of image segmentation of a self-driving car, the mask processing model MM can set a semantic ROI mask SRM2 (a multiple DOF Mask) for the high-resolution image HR, where regions R1 to R5 in the semantic ROI mask SRM2 have different values respectively, different values correspond to different weight values in a weight set, and a single weight value corresponds to the same type of object in the high-resolution image HR. For example, the weight value of pixels of the region is set according to a degree of interest (i.e., the pixels of the region being more interesting is set the weight value being higher). Suppose a user is most interested in a car, the pixels of the region R4 have highest weight value in this time.

Next, the mask processing model MM can sequentially perform the multiplication operation on pixel values of pixels in the super-resolution image SR1 with the weight values in the semantic ROI mask SRM2 to generate the attention weighted super-resolution image RWI1, and can sequentially perform the multiplication operation on pixel values of pixels in the high-resolution image HR with the weight values in the semantic ROI mask SRM2 to generate the attention weighted high-resolution image RWI2.

Next, the loss model LM can receive attention weighted super-resolution images RWI1 and attention weighted high-resolution images RWI2, sequentially subtract pixel values of pixels of the attention weighted super-resolution image RWI1 from pixel values of the pixels of the attention weighted high-resolution image RWI2, take absolute values of an obtained differences, and finally can sum them up to generate the first loss loss1 (i.e., L1 distance operation).

In aforementioned usage scenarios, although the corresponding masks and the loss calculations are used for different usage scenario, in practice, the aforementioned usage scenario can also use the masks and loss calculations used in other usage scenarios. For example, in the usage scenario of iris recognition above, the loss model LM also can perform the L1 distance operation and the L2 distance operation on the attention weighted super-resolution image RWI1 and the attention weighted high-resolution image RWI2 to generate a L1 distance value and a L2 distance value, and perform a weighting operation on the L1 distance value and the L2 distance value according to two preset weight values corresponding to the L1 distance value and the L2 distance value to generate the first loss loss1.

In summary, the image processing device and the super-resolution processing method of the embodiments of the present disclosure can use the attention model related to the image mask to generate the first loss to update the super-resolution model, thereby improving the effect of super-resolution processing. In addition, the ROI in the image in the attention model or the weight set can be used to enhance the ROI in the high-resolution image, thereby improving the effect of super-resolution processing of the ROI in the high-resolution image.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing device, comprising:
   an image capturing circuit, configured for capturing a high-resolution image; and
   a processor, connected to the image capturing circuit, and performing a super-resolution model and an attention model, wherein the processor is configured to perform following operations for:
   performing down sampling processing on the high-resolution image to generate a low-resolution image;
   performing super-resolution processing on the low-resolution image using the super-resolution model to generate a super-resolution image;
   applying the attention model to the high-resolution image and the super-resolution image to generate an attention weighted high-resolution image and an attention weighted super-resolution image, and calculating a first loss according to the attention weighted high-resolution image and the attention weighted super-resolution image; and
   updating the super-resolution model according to the first loss.

2. The image processing device of claim 1, wherein the processor is further configured to perform following operations:
   applying the attention model to the high-resolution image and the super-resolution image for performing image filtering processing to generate the attention weighted high-resolution image and the attention weighted super-resolution image.

3. The image processing device of claim 2, wherein the image filtering processing is an element-wise multiplication operation, an element-wise addition operation, an element-wise subtraction operation, or a combination thereof.

4. The image processing device of claim 1, wherein the attention model comprises a mask processing model corresponding to at least one image mask, and the processor is further configured to perform following operations:
   performing image filtering processing on the high-resolution image and the super-resolution image respectively using the mask processing model to generate the attention weighted high-resolution image and the attention weighted super-resolution image.

5. The image processing device of claim 4, wherein the at least one image mask corresponds to at least one image region of interest, and the processor is further configured to perform following operations:
   generate the attention weighted high-resolution image and the attention weighted super-resolution image according to the at least one image region of interest, the high-resolution image and the super-resolution image.

6. The image processing device of claim 5, wherein the processor is further configured to perform following operations:
   performing an element-wise multiplication operation on the high-resolution image and the super-resolution image respectively according to the at least one image region of interest to generate the attention weighted high-resolution image and the attention weighted super-resolution image, wherein the attention weighted high-resolution image and the attention weighted super-resolution image correspond to the high-resolution image and the super-resolution image, respectively; and
   performing a distance function operation according to the attention weighted high-resolution image and the attention weighted super-resolution image to generate the first loss, wherein the distance function operation is an L1 distance operation, an L2 distance operation, a Charbonnier distance operation, or a combination thereof.

7. The image processing device of claim 4, wherein the at least one image mask corresponds to at least one weight set, and the processor is further configured to perform following operations:
   generating the attention weighted high-resolution image and the attention weighted super-resolution image according to the at least one weight set, the high-resolution image and the super-resolution image.

8. The image processing device of claim 7, wherein the processor is further configured to perform following operations:
   performing an element-wise multiplication operation on the high-resolution image and the super-resolution image respectively according to the at least one weight set to generate the attention weighted high-resolution image and the attention weighted super-resolution image, wherein the attention weighted high-resolution image and the attention weighted super-resolution image correspond to the high-resolution image and the super-resolution image, respectively; and
   performing a distance function operation according to the attention weighted high-resolution image and the attention weighted super-resolution image to generate the first loss, wherein the distance function operation is an L1 distance operation, an L2 distance operation, a Charbonnier distance operation, or a combination thereof.

9. The image processing device of claim 1, wherein the processor is further configured to perform following operations:
   calculating a second loss according to the high-resolution image and the super-resolution image using the super-resolution model.

10. The image processing device of claim 9, wherein the processor is further configured to perform following operations:
    calculating a total loss according to the first loss and the second loss, and performing a back propagation operation on the super-resolution model according to the total loss to generate an updated super-resolution model.

11. A super-resolution processing method, comprising:
  capturing a high-resolution image, and performing down sampling processing on the high-resolution image to generate a low-resolution image;
  performing super-resolution processing on the low-resolution image using a super-resolution model to generate a super-resolution image;
  applying an attention model to the high-resolution image and the super-resolution image to generate an attention weighted high-resolution image and an attention weighted super-resolution image, and calculating a first loss according to the attention weighted high-resolution image and the attention weighted super-resolution image; and
  updating the super-resolution model according to the first loss.

12. The super-resolution processing method of claim 11, wherein the step of applying the attention model to the high-resolution image and the super-resolution image to generate the attention weighted high-resolution image and the attention weighted super-resolution image comprises:
  applying the attention model to the high-resolution image and the super-resolution image for performing image filtering processing to generate the attention weighted high-resolution image and the attention weighted super-resolution image.

13. The super-resolution processing method of claim 12, wherein the image filtering processing is an element-wise multiplication operation, an element-wise addition operation, an element-wise subtraction operation, or a combination thereof.

14. The super-resolution processing method of claim 11, wherein the attention model comprises a mask processing model corresponding to at least one image mask, and the step of applying the attention model to the high-resolution image and the super-resolution image to generate the attention weighted high-resolution image and the attention weighted super-resolution image comprises:
  performing image filtering processing on the high-resolution image and the super-resolution image respectively using the mask processing model to generate the attention weighted high-resolution image and the attention weighted super-resolution image.

15. The super-resolution processing method of claim 14, wherein the at least one image mask corresponds to at least one image region of interest, and the step of applying the attention model to the high-resolution image and the super-resolution image to generate the attention weighted high-resolution image and the attention weighted super-resolution image further comprises:
  generate the attention weighted high-resolution image and the attention weighted super-resolution image according to the at least one image region of interest, the high-resolution image and the super-resolution image.

16. The super-resolution processing method of claim 15, wherein the step of applying the attention model to the high-resolution image and the super-resolution image to generate the attention weighted high-resolution image and the attention weighted super-resolution image further comprises:
  performing an element-wise multiplication operation on the high-resolution image and the super-resolution image respectively according to the at least one image region of interest to generate the attention weighted high-resolution image and the attention weighted super-resolution image, wherein the attention weighted high-resolution image and the attention weighted super-resolution image correspond to the high-resolution image and the super-resolution image, respectively,
  wherein the step of calculating the first loss according to the attention weighted high-resolution image and the attention weighted super-resolution image comprises:
    performing a distance function operation according to the attention weighted high-resolution image and the attention weighted super-resolution image to generate the first loss, wherein the distance function operation is an L1 distance operation, an L2 distance operation, a Charbonnier distance operation, or a combination thereof.

17. The super-resolution processing method of claim 14, wherein the at least one image mask corresponds to at least one weight set, and the step of applying the attention model to the high-resolution image and the super-resolution image to generate the attention weighted high-resolution image and the attention weighted super-resolution image further comprises:
  generate the attention weighted high-resolution image and the attention weighted super-resolution image according to the at least one weight set, the high-resolution image and the super-resolution image.

18. The super-resolution processing method of claim 17, wherein the step of applying the attention model to the high-resolution image and the super-resolution image to generate the attention weighted high-resolution image and the attention weighted super-resolution image further comprises:
  performing an element-wise multiplication operation on the high-resolution image and the super-resolution image respectively according to the at least one weight set to generate the attention weighted high-resolution image and the attention weighted super-resolution image, wherein the attention weighted high-resolution image and the attention weighted super-resolution image correspond to the high-resolution image and the super-resolution image, respectively,
  wherein the step of calculating the first loss according to the attention weighted high-resolution image and the attention weighted super-resolution image comprises:
    performing a distance function operation according to the attention weighted high-resolution image and the attention weighted super-resolution image to generate the first loss, wherein the distance function operation is an L1 distance operation, an L2 distance operation, a Charbonnier distance operation, or a combination thereof.

19. The super-resolution processing method of claim 11, wherein the step of updating the super-resolution model according to the first loss comprises:
  calculating a second loss according to the high-resolution image and the super-resolution image using the super-resolution model.

20. The super-resolution processing method of claim 19, wherein the step of updating the super-resolution model according to the first loss further comprises:
  calculating a total loss according to the first loss and the second loss, and performing a back propagation operation on the super-resolution model according to the total loss to generate an updated super-resolution model.

* * * * *